United States Patent
Stanev

[11] 3,887,022
[45] June 3, 1975

[54] RAILWAY VEHICLE-LOAD MEASURING METHOD AND DEVICE

[75] Inventor: Tzvyatko Penchev Stanev, Sofia, Bulgaria

[73] Assignee: DSO "Bulgarski Darjavni Jeleznitzi", Sofia, Bulgaria

[22] Filed: Aug. 16, 1973

[21] Appl. No.: 388,888

[52] U.S. Cl. .............................. 177/146; 73/141 A
[51] Int. Cl. ............................................ G01g 19/02
[58] Field of Search ........... 177/146; 73/141 A, 146

[56] References Cited
UNITED STATES PATENTS

| | | | |
|---|---|---|---|
| 1,536,715 | 5/1925 | Huckel | 177/146 |
| 3,151,693 | 10/1964 | Chapman | 73/141 A |
| 3,167,953 | 2/1965 | Dillon | 73/141 A |

FOREIGN PATENTS OR APPLICATIONS

| | | | |
|---|---|---|---|
| 424,617 | 1/1926 | Germany | 177/146 |
| 519,619 | 6/1921 | France | 177/146 |

Primary Examiner—Donald O. Woodiel
Attorney, Agent, or Firm—Karl F. Ross; Herbert Dubno

[57] ABSTRACT

The load of a railroad car is measured by placing the base of a measuring device upon the flange of the track and lifting the lower leg of a U-shaped member upwardly to bring the upper leg of this member into engagement with the vehicle wheel. A lever is fulcrumed on the lower leg and has one side biased by the free upper arm while the other side acts upon a meter displaying the load.

3 Claims, 4 Drawing Figures

RAILWAY VEHICLE-LOAD MEASURING METHOD AND DEVICE

FIELD OF THE INVENTION

The present invention relates to a method of and a device for measuring the load applied by a wheel of a railroad vehicle to a track.

BACKGROUND OF THE INVENTION

The load of a railroad vehicle wheel has been measured heretofore by special equipment mounted below the railroad level and having a number of devices corresponding to the number of wheels of the railroad car. Such equipment is expensive and occupies considerable space and is not adaptable for use with vehicles having different wheel bases.

In another system a hydraulic device provided with a pressure gauge is located beneath the axle box of a vehicle and is operated to lift the vehicle wheels from the track. The gauge responsive to hydraulic pressure can read the load which may then be calculated in terms of the loads on the opposite wheels, to provide the measurement. This system has been found to be subject to low sensitivity and error, and has the disadvantage that rigid supports must be provided under the axle boxes of the vehicle.

OBJECT OF THE INVENTION

It is the object of the present invention to obviate the aforementioned disadvantages.

SUMMARY OF THE INVENTION

This object is achieved by the lifting of a wheel with a deformable sensing element, the deflection of the latter being measured by a dial indicator. The reading at the moment of disengagement of the wheel from the track, which is evident from the lack of further acceleration of the needle, provides the measurement.

The measuring instrument, according to the invention, comprises a elastically deformable U-shaped shackle of spring steel, a bushing fixed to the lower arm of this shackle and receiving an eccentric portion of a crankshaft and based on which the crankshaft is mounted and which can bear against the lower flange or foot of the rail, a manual lever for rotating the crank and a measuring lever responsive to the deflection of the free upper arm of the shackle. The latter lever is a rocker arm fulcrumed on the bushing and engaged at one end by the free end of the shackle and at the other end by the rod of a compression-reading indicator mounted upon the shackle.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
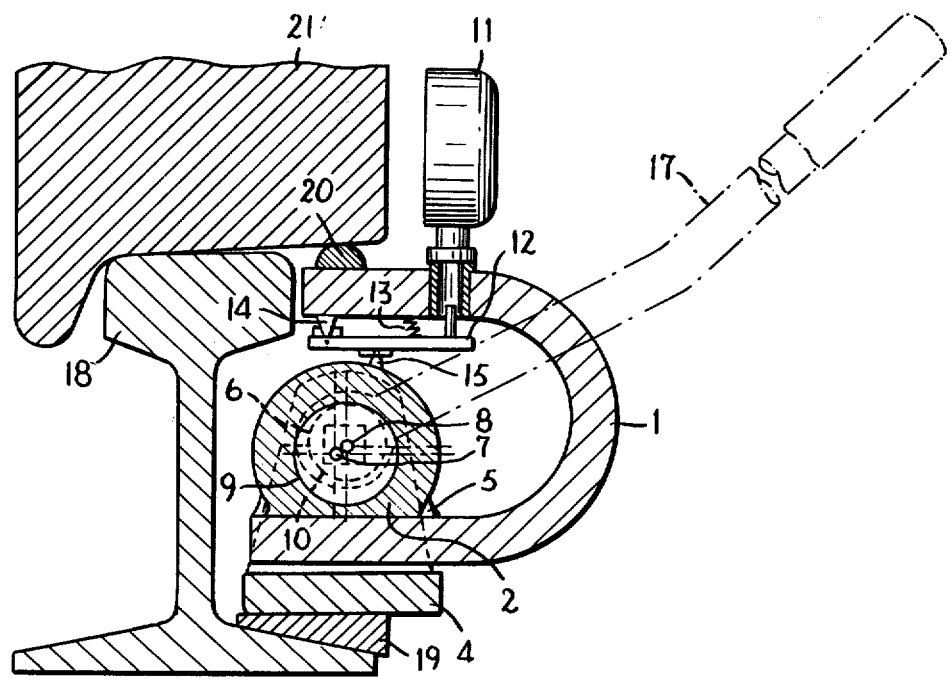
FIG. 1 is a vertical cross section through the device of the present invention.
Figure 2:
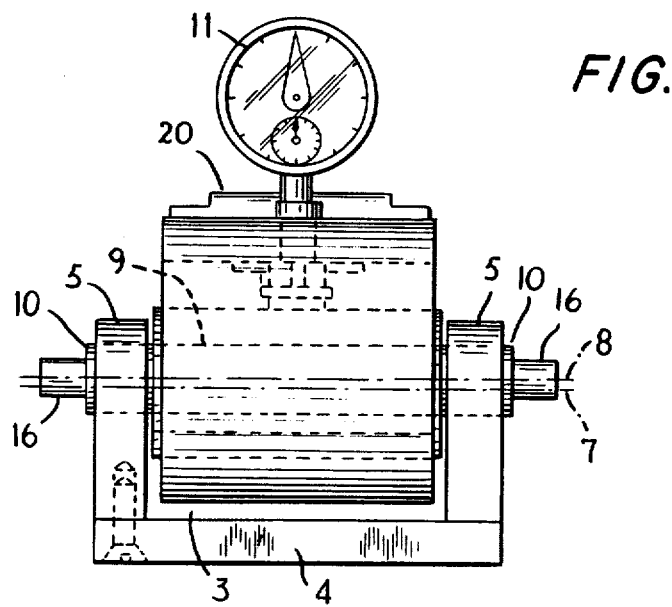
FIG. 2 is a side elevational view thereof.
Figure 3:
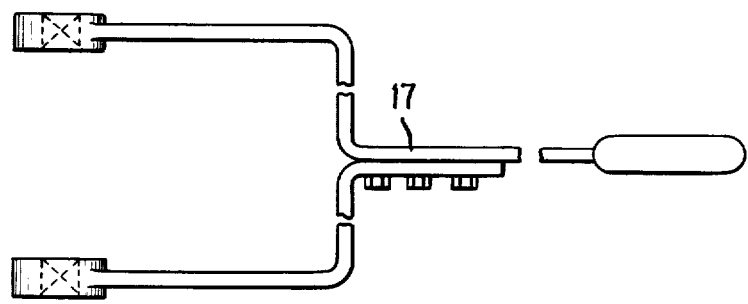
FIG. 3 is a top view of the operating lever of the device.

In FIGS. 1-3 I show a deformable shackle 1 of U configuration having a lower arm which is provided with a bushing 2 and disposed above a base 4 whose trunions 5 receive a crank shaft 6. The middle section 9 of the crank shaft has a center 7 which is offset from the center 8 of a pair of square-end pins 16 which may be received in the square holes of a lever 17 shown in solid lines in FIG. 3 but in dot-dash lines in FIG. 1.

The bearings 10 support the shaft 6 rotatably.

The measuring unit comprises a rocker arm 12 resting upon a knife-edge fulcrum 15 of the bushing 2 and engaged by a knife edge 14 on the free end of the upper arm of the shackle 1. A spring 13 urges the rocker arm 12 into constant engagement with the knife edges 14 and 14, and the other end of the rocker arm 12 is engaged by a pin of a compression-force gauge 11. A supporting edge 20 is provided on the upper side of the upper arm of shackle 1 to engage the vertical wheel.

The device shown in FIGS. 1-3 is mounted on the foot or lower flange of a rail 18 below the wheel 21 so that the base 4 of the support 3 lies on the rail foot or is in-force transmitting relation therewith through a plate 19. The edge 20 is positioned below the wheel.

Figure 4:
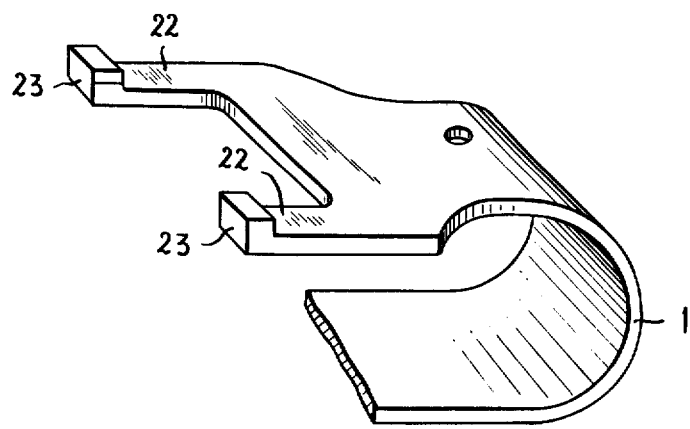
FIG. 4 is a axonometric view of a modified shackle according to the invention.

The arm 17 is then rotated to rise the bushing 2 and the shackle 1 until the wheel is lifted from the track. During this movement, the arms of the shackle 1 are deflected toward one another and the rocker arm 12 is rotated in the counterclockwise sense (FIG. 1) about its fulcrum 15 and the reading of gauge 11 increases until the wheel has been lifted from the track. At this movement the load corresponds to the reading of the gauge.

Where it is necessary for precision that the measuring arm enter the rolling circle of the wheel, the shackle has the bifurcated arrangement shown in FIG. 4 in which the legs 22 pass over the rail and beneath the wheel and the lugs 23 engage at the rolling circle.

What we claim is:

1. An apparatus for measuring the load of a vehicle wheel, comprising a support, a U-shaped shackle on said support having a lower arm and an upper arm, said arms being relatively deflectable, a crankshaft journaled on said support and having an eccentric portion received between said arms, a bushing fixed to the lower arm and receiving said eccentric portion, a rocker arm fulcrumed on said bushing and having one end engaged by the upper arm of said shackle, a compressive-force guage on said upper arm engaging another end of said rocker arm, and a manual lever connected to said shaft for raising said lower arm, thereby bringing said upper arm into engagement with said wheel and causing relative deflection of said upper and lower arms and rotation of said rocker arm.

2. The apparatus defined in claim 1 wherein said upper arm is provided with a wheel-engaging edge of semicircular cross section.

3. The appartus defined in claim 1 wherein said upper arm is bifurcated and has a pair of lugs engageable with said wheel.

* * * * *